J. LEDWINKA.
MOTOR VEHICLE.
APPLICATION FILED JAN. 11, 1921.
1,431,314.
Patented Oct. 10, 1922.
2 SHEETS—SHEET 1.
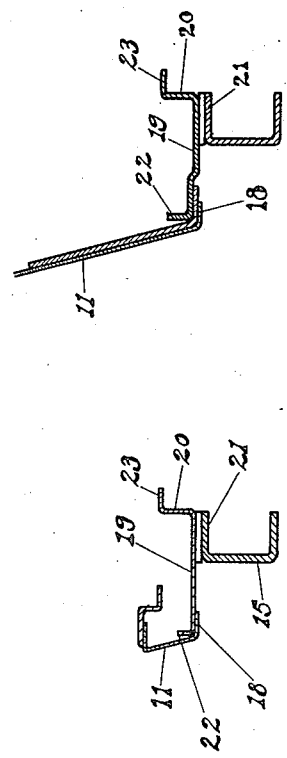
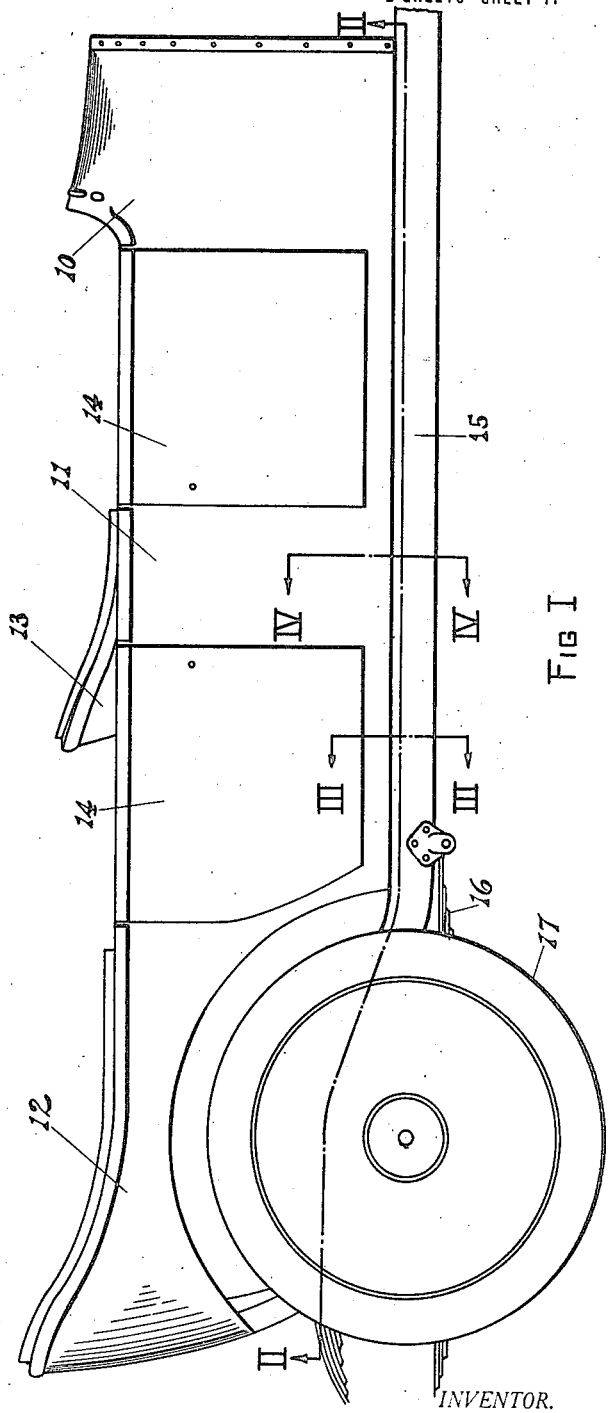
WITNESS:
Walter M. Frost
INVENTOR.
JOSEPH LEDWINKA
BY C. B. Desjardins
ATTORNEY.

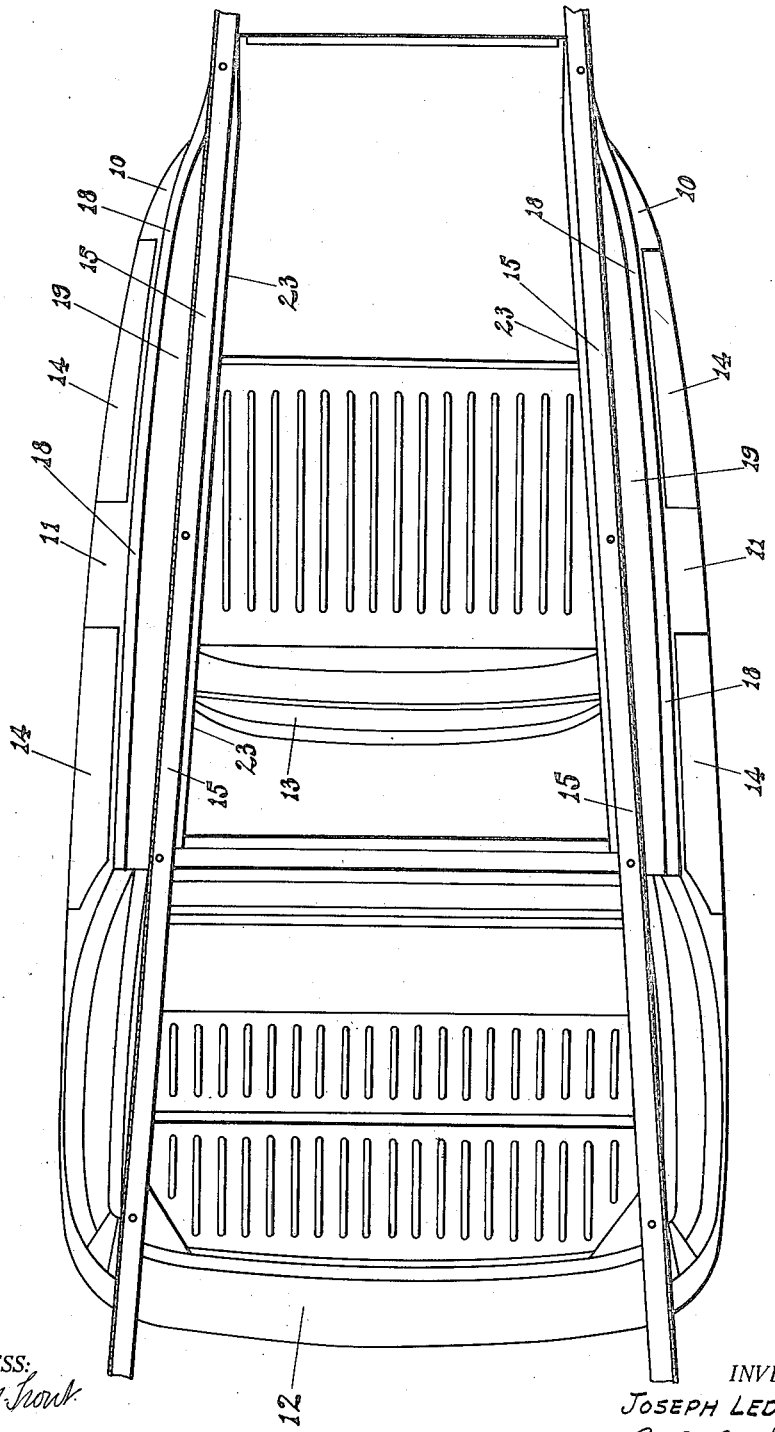

Patented Oct. 10, 1922.

1,431,314

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

MOTOR VEHICLE.

Application filed January 11, 1921. Serial No. 436,630.

*To all whom it may concern:*

Be it known that I, JOSEPH LEDWINKA, a citizen of the United States, residing at Philadelphia, Pennsylvania, have invented certain new and useful Improvements in Motor Vehicles, of which I declare the following to be a full, clear, and exact description.

This invention relates to improvements in motor vehicles, and has to do with the construction of motor vehicle bodies and their mounting on the chassis frame of the motor vehicle.

This invention is an improvement on the inventions described and claimed in my applications, Serial No. 290,787, filed April 17th, 1919, and Serial No. 431,732 filed Dec. 18, '20.

The principal object of this invention is to provide a motor vehicle having the body constructed entirely of metal, with its framework so constructed and disposed with reference to the body shell and chassis frame of the motor vehicle as to prevent the distortion of the body under conditions of use.

A further object of my invention is to provide a metal body construction for motor vehicles which will be particularly staunch, strong and durable.

Another object of my invention is to provide a motor vehicle body construction having straight body sills which are provided with portions reinforcing the longitudinally curved lower edges of the body, so as to preserve their contour and prevent such portions of the body from being dented or distorted.

Further objects, and objects relating to economies of material and details of construction, will definitely appear from the detailed description to follow. I accomplish the objects of my invention by the devices and means described in the following specification. My invention is clearly pointed out and defined in the appended claims. A structure, constituting a preferred embodiment of my invention, is illustrated in the accompanying drawings, forming a part of this specification, in which:

Fig. I is a view in side elevation of a motor vehicle embodying my invention, the fenders and running board being removed.

Fig. II is a bottom plan view of the body shown in Fig. I, taken in section through the chassis frame on the line II—II of Fig. I.

Fig. III is a detail, sectional view taken on the line III—III of Fig. I, the door being omitted.

Fig. IV is a detail, sectional view taken on the line IV—IV of Fig. I.

In the drawings, similar reference numerals refer to similar parts throughout the several views, and the sectional views are taken looking in the direction of the little arrows at the ends of the section lines.

In my prior applications referred to above, I have described and illustrated motor vehicle body constructions which employ straight body sills or body sills having straight girder portions. As pointed out in said applications, it has been the practice to employ body sills which conform to the longitudinal curvature of the lower edges of the body shell. Such body sills are subject to the objection, however, that, in use, they have a tendency to bulge outwardly under the vertical strain imposed by the body load, due to the longitudinal curvature of the sills. In the construction described in the applications mentioned above, I have eliminated such objections by employing body sills having straight girder portions. I have also illustrated, in one of these applications a motor vehicle construction in which the body sills are supported throughout their length on the side members of the chassis frame, and directly connected thereto. However, in these constructions, the body sill does not follow and conform to the longitudinal curvature of the lower edge of the body shell.

In general, I accomplish the objects of my present invention by providing a body construction employing body sill members each of which has a straight girder portion, which, in some cases, I support throughout its length directly upon and connect directly to, the side member of the chassis frame. These body sill members are provided with an outer portion which is connected to the lower edge of the body shell and reinforces it. In some cases, I may provide this outer edge with a vertical flange so as to render it a better reinforcing member.

In the drawings, I have shown one particular embodiment of my invention which has proven to be very satisfactory. This embodiment comprises a body construction including the cowl panel, 10, side panels, 11, tonneau panels, 12, front seat, 13, and doors, 14, mounted in the usual position. This body is mounted upon the chassis frame of a motor vehicle, including the chassis frame side members, 15, to which are connected the springs, 16, and the wheels, 17. The lower edge portions of the side panels, 11, of the body shell, are turned inwardly, forming the inwardly extending flanges, 18. The body sill members, 19, are secured to the flanges, 18, of the side panels, 11, and each body sill is provided with a vertical flange, 20, at its inner edge, forming a longitudinally straight girder portion extending from one end to the other of the body shell. The body sill, 19, is supported throughout its length upon the upper flange, 21, of the side member of the chassis frame, and is connected thereto adjacent the straight vertical flange, 20. The lower edge of the side panel, 11, is longitudinally curved from end to end to conform to the curvature of the body, and, at different parts of the body this lower edge extends at different distances from the side members of the chassis frame. This will appear from an inspection of Fig. II of the drawings. The body sill, 19, is of corresponding varying width and its outer edge, instead of being longitudinally straight, as is the flange, 20, is longitudinally curved, to conform to the curvature of the lower edge of the body shell and disposed adjacent thereto. I may provide this outer edge of the body sill with a vertical flange, 22, as shown in Figs. III and IV, to stiffen this portion of the sill member. The vertical flange, 20, of the body sill may have a lateral flange, 23, at its upper edge constituting a support for the floor boards.

It will appear, therefore, that, in this embodiment of my invention, I provide a body sill having an inner edge formed into a longitudinally straight girder portion and an outer edge formed into a longitudinally curved reinforcing portion, which is disposed adjacent to, and is curved to conform to, the lower edge of the body panel. The body sill is supported throughout its length on the side member of the chassis frame, adjacent the straight girder portion of the body sill, and may be directly connected to such side member.

By means of this construction I provide a body which will not tend to bulge outwardly under vertical loads, due to the fact that the body sills have straight girder portions extending from end to end. At the same time, the body sills are so formed and positioned that they protect the angle at the lower edge of the body shell. This exposed part of the body is likely to be dented or forced out of shape by accidents and the formation of the body sill, which I have described here, helps to strengthen this portion of the body and to preserve its shape. It will be observed from Fig. III that the outer lower edge of the body lies outside the margin of the chassis frame, while the body load is transferred directly to the sill members, and, since these are directly supported by the side members of the chassis frame, the load is directly transferred to such chassis frame and there is no tendency for the body to sag at the sides, or bulge upwardly in the center, when it has been used considerably with heavy loads.

I am aware that the particular embodiment of my invention which I have shown and described here, is susceptible of considerable variation, without departing from the spirit of my invention, and therefore, I desire to claim my invention broadly, as well as specifically, as indicated by the appended claims.

Having thus described my invention, what I claim as new and desire to secure by Letters Patent is:

1. A sheet metal body structure for automobiles comprising a body panel longitudinally curved to conform to the curvature of the body and having an inwardly-extending flange at its lower edge, and a body sill secured to said flange, said sill having a horizontal body portion with a longitudinally straight girder portion extending upwardly therefrom at its inner edge, and an edge flange extending upwardly from said body portion at its outer edge, and longitudinally curved to conform to the longitudinal curvature of the body panel.

2. In an automobile body structure, the combination of sheet metal body panels disposed at the sides of the automobile body and each longitudinally curved to conform to the curvature of the body and having an inwardly extending flange at its lower edge, and a pair of sill members secured to said flanges, one at each side of the body, each of said sill members having a horizontal body portion with a longitudinally straight girder portion extending upwardly therefrom at its inner edge, and an outer edge flange spaced at varying distances from said girder portion and extending upwardly from the body portion of said sill.

3. In an automobile body structure, the combination of a sheet metal body panel having an inwardly-extending flange at its lower edge and a sill member secured to said flange and having a horizontal body portion with a longitudinally straight girder portion extending upwardly therefrom at its inner edge and an outer edge flange disposed adjacent the lower edge of said body panel and spaced from said girder portion, said flange extending upwardly from said horizontal body portion.

4. In an automobile body structure, the combination of a sheet metal body panel and a sill member secured to the lower edge of said panel and having a horizontal body portion with a vertical flange extending upwardly from its outer edge and longitudinally conforming to the lower edge of said panel, said sill member also having a vertical flange extending upwardly from its inner edge and forming a longitudinally straight girder portion and having a lateral flange forming a floor board support.

5. In a motor vehicle, the combination with a chassis frame, of a sheet metal body structure comprising a body panel longitudinally curved to conform to the curvature of the body and having an inwardly-extending flange at its lower edge, and a body sill secured to said flange, said sill having a horizontal body portion with a longitudinally straight girder portion extending upwardly therefrom at its inner edge and an outer edge flange longitudinally curved to conform to the lower edge of the body panel and extending upwardly from said body portion, the girder portion of said sill supporting throughout its length upon and connected to a side member of said chassis frame.

In testimony whereof, I affix my signature.

JOSEPH LEDWINKA.